US010581097B2

(12) United States Patent
Rovik (10) Patent No.: US 10,581,097 B2
(45) Date of Patent: Mar. 3, 2020

(54) OPERATING FUEL CELL VEHICLES DURING INCLINATION EVENTS

(71) Applicant: Toyota Motor Engineering & Manufacturing North America, Inc., Erlanger, KY (US)

(72) Inventor: Christopher Lee Rovik, McKinney, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 205 days.

(21) Appl. No.: 15/872,185

(22) Filed: Jan. 16, 2018

(65) Prior Publication Data
US 2019/0221871 A1   Jul. 18, 2019

(51) Int. Cl.
| H01M 8/04291 | (2016.01) |
| B60K 1/04 | (2019.01) |
| B60L 50/71 | (2019.01) |
| B60L 50/72 | (2019.01) |
| B60K 1/00 | (2006.01) |

(52) U.S. Cl.
CPC ........... *H01M 8/04291* (2013.01); *B60K 1/04* (2013.01); *B60L 50/71* (2019.02); *B60L 50/72* (2019.02); *B60K 1/00* (2013.01); *B60K 2001/0438* (2013.01); *B60L 2240/32* (2013.01); *H01M 2250/20* (2013.01)

(58) Field of Classification Search
CPC .......... H01M 8/04291; H01M 2250/20; B60L 50/72; B60L 50/71; B60L 2240/32; B60K 1/04; B60K 1/00; B60K 2001/0438
See application file for complete search history.

(56) References Cited

U.S. PATENT DOCUMENTS

| 2006/0222923 | A1* | 10/2006 | Muramatsu | ....... H01M 8/04208 |
| | | | | 429/410 |
| 2007/0134523 | A1* | 6/2007 | Sung | ................. H01M 8/04089 |
| | | | | 429/444 |
| 2012/0293110 | A1* | 11/2012 | Frederick | ................ H01M 4/46 |
| | | | | 320/101 |

(Continued)

FOREIGN PATENT DOCUMENTS

| JP | 2009158338 A | 7/2009 |
| JP | 2011009137 A | 1/2011 |
| JP | 2012226896 A | 11/2012 |

*Primary Examiner* — Lisa S Park
(74) *Attorney, Agent, or Firm* — Christopher G. Darrow; Darrow Mustafa PC (57) ABSTRACT

A vehicle includes a body, a fuel cell stack supported by the body for tilting relative thereto, a pivoting system and at least one control module. The fuel cell stack includes a fuel cell operable to generate electrical energy using fuel and exhaust water as a byproduct, and an exhaust water drainage port in fluid communication with the fuel cell. The pivoting system is mechanically connected between the body and the fuel cell stack, and operable to selectively tilt the fuel cell stack relative to the body. The at least one control module is communicatively connected to the pivoting system, and configured to operate the pivoting system in response to an inclination event associated with the body being tilted away from the exhaust water drainage port. By the operation of the pivoting system, the fuel cell stack is tilted relative to the body toward the exhaust water drainage port.

20 Claims, 4 Drawing Sheets

(56) References Cited

U.S. PATENT DOCUMENTS

2013/0149617 A1\* 6/2013 Yoshida .................. B60K 1/00
  429/414
2015/0318562 A1\* 11/2015 Hausmann ........ H01M 8/04201
  429/415

\* cited by examiner

OPERATING FUEL CELL VEHICLES DURING INCLINATION EVENTS

TECHNICAL FIELD

The embodiments disclosed herein relate to vehicles and, more particularly, to fuel cell vehicles (FCVs).

BACKGROUND

Many vehicles are electrified vehicles or, in other words, vehicles that have an electrified powertrain. The typical electrified vehicle has a more or less traditional drivetrain. Specifically, as part of the drivetrain, the electrified vehicle includes one or more wheels, as well as a transmission, a differential, a drive shaft and the like, to which the wheels are mechanically connected. However, in place of an engine, the electrified vehicle include one or more motors. And, as part of the electrified powertrain, the drivetrain is mechanically connected to the motors. In conjunction with the drivetrain, the motors are operable to power the wheels using electrical energy. Many electrified vehicles are, moreover, fuel cell vehicles (FCVs) or, in other words, electrified vehicles that include one or more fuel cell stacks. In FCVs, the fuel cell stacks are operable to generate the electrical energy used by the motors to power the wheels.

SUMMARY

Disclosed herein are embodiments of vehicles with elements of a water exhaust system for a fuel cell stack with fuel cells, as well as a pivoting system operable in conjunction with the elements of the water exhaust system to ensure the discharge of exhaust water from around the fuel cells. In one aspect, a vehicle includes a body, a fuel cell stack supported by the body for tilting relative thereto, a pivoting system and at least one control module. The fuel cell stack includes a fuel cell operable to generate electrical energy using fuel and exhaust water as a byproduct, and an exhaust water drainage port in fluid communication with the fuel cell. The pivoting system is mechanically connected between the body and the fuel cell stack, and operable to selectively tilt the fuel cell stack relative to the body. The at least one control module is communicatively connected to the pivoting system, and configured to operate the pivoting system in response to an inclination event associated with the body being tilted away from the exhaust water drainage port. By the operation of the pivoting system, the fuel cell stack is tilted relative to the body toward the exhaust water drainage port.

In another aspect, a vehicle includes a body, an exhaust water collector for a fuel cell stack supported by the body for tilting relative thereto, a pivoting system and at least one control module. The pivoting system is mechanically connected between the body and the exhaust water collector, and operable to selectively tilt the exhaust water collector relative to the body. The at least one control module is communicatively connected to the pivoting system, and configured to operate the pivoting system in response to an inclination event associated with the body being tilted from the gravity direction. By the operation of the pivoting system, the exhaust water collector is tilted relative to the body toward the gravity direction.

In yet another aspect, a vehicle includes a body, a fuel cell stack supported by the body for tilting relative thereto, a pivoting system and at least one control module. The fuel cell stack includes a fuel cell operable to generate electrical energy using fuel and exhaust water as a byproduct, an internal exhaust water collector in fluid communication with the fuel cell, and an exhaust water drainage port on the exhaust water collector in fluid communication therewith. The exhaust water collector is subject to assuming the inclination of the fuel cell stack. Moreover, on the exhaust water collector, the exhaust water drainage port is below a nominal exhaust water level local to the exhaust water collector. The pivoting system is mechanically connected between the body and the fuel cell stack, and operable to selectively tilt the fuel cell stack relative to the body. The at least one control module is communicatively connected to the pivoting system, and configured to operate the pivoting system in response to an inclination event associated with the body being tilted away from the exhaust water drainage port. By the operation of the pivoting system, the fuel cell stack is tilted relative to the body toward the exhaust water drainage port, whereby on the exhaust water collector, when there is exhaust water therein, the exhaust water drainage port is below an actual exhaust water level local to the exhaust water.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches vehicles that include a fuel cell stack with fuel cells, a water exhaust system for the fuel cell stack, and a pivoting system. The pivoting system is operable in conjunction with the water exhaust system to ensure the discharge of exhaust water from around the fuel cells.

Fuel Cell Vehicle

Figure 1:
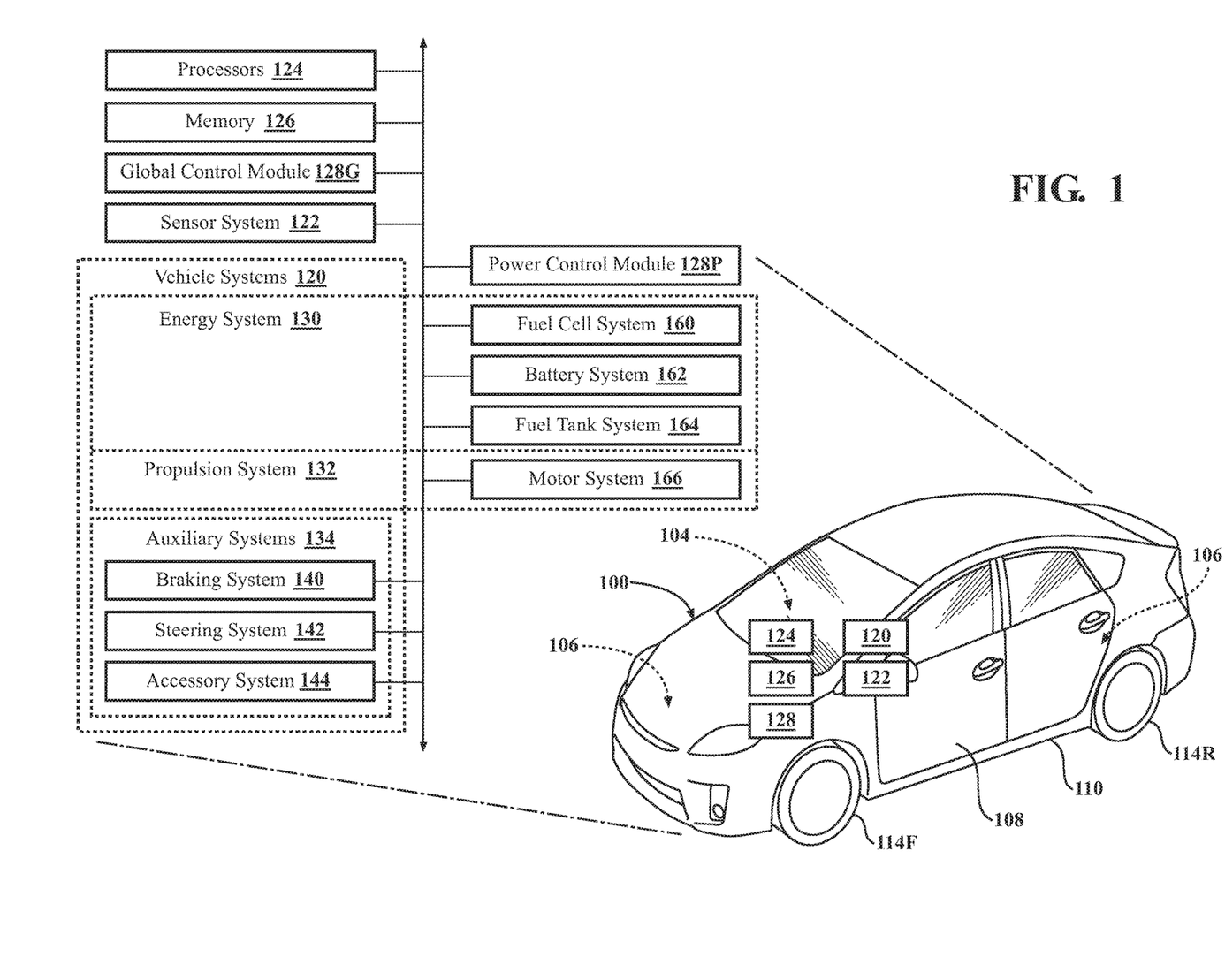
FIG. 1 is a portrayal of a fuel cell vehicle (FCV) using a perspective view and block diagrams, showing a body, vehicle systems, a sensor system and control modules, with the vehicle systems including an energy system with a fuel cell system, a battery system and a fuel tank system, a propulsion system with a motor system, and auxiliary systems.

A fuel cell vehicle (FCV) 100 is shown in FIG. 1. In this description, uses of "front," "forward" and the like, and uses of "rear," "rearward" and the like, refer to the longitudinal directions of the FCV 100. "Front," "forward" and the like refer to the front (fore) of the FCV 100, while "rear," "rearward" and the like refer to the back (aft) of the FCV 100. Uses of "side," "sideways," "transverse" and the like refer to the lateral directions of the FCV 100, with "driver's side" and the like referring to the left side of the FCV 100, and "passenger side" and the like referring to the right side of the FCV 100.

The FCV 100 has an exterior and a number of interior compartments. The compartments include a passenger compartment 104 and one or more engine compartments 106. The FCV 100 may include, among other things, seats and a dash assembly housed in its passenger compartment 104.

The FCV 100 has a body 108 that forms its exterior and defines its compartments. The body 108 has upright sides, a floor, a front end, a rear end, a roof and the like. In addition to the body 108, the FCV 100 has an underbody 110 for the FCV 100. The underbody 110, like the body 108, forms the exterior of the FCV 100.

The FCV 100 has a drivetrain. The drivetrain is part of, mounted to or otherwise supported by the body 108. The drivetrain may be housed, in whole or in part, in any combination of the passenger compartment 104, the engine compartments 106 or elsewhere in the FCV 100. As part of the drivetrain, the FCV 100 includes wheels 114. The wheels 114 support the remainder of the FCV 100 on the ground. The FCV 100 includes four wheels 114, two of which are front wheels 114F, and two of which are rear wheels 114R. The two driver's side wheels 114 are shown, with the other two, passenger side wheels 114 being mirror images. One, some or all of the wheels 114 are powered to drive the FCV 100 along the ground. In a front-wheel drive arrangement, one, some or all of the front wheels 114F are powered to drive the FCV 100 along the ground. For this purpose, also as part of the drivetrain, in addition to the wheels 114, the FCV 100 includes any penultimate combination of a transmission, a differential, a drive shaft and the like, to which the wheels 114 are mechanically connected.

The FCV 100 operates as an assembly of interconnected items that equip the FCV 100 to satisfy real-time vehicle demands. Generally speaking, a vehicle demand corresponds to a vehicle function whose performance satisfies the vehicle demand. Accordingly, the FCV 100 is equipped, in operation, to satisfy one or more vehicle demands by performing one or more corresponding vehicle functions. With respect to performing vehicle functions, the FCV 100 is subject to any combination of manual operation and autonomous operation. In the case of manual operation, the FCV 100 may be manual-only. In the case of autonomous operation, the FCV 100 may be semi-autonomous, highly-autonomous or fully-autonomous.

For purposes of satisfying vehicle demands, the FCV 100 includes one or more vehicle systems 120. Either alone or in conjunction with the drivetrain, the vehicle systems 120 are operable to perform vehicle functions on behalf of the FCV 100, and thereby satisfy corresponding vehicle demands on behalf of the FCV 100. Any combination of the vehicle systems 120 may be operable to perform a vehicle function. Accordingly, from the perspective of a vehicle function, as well as a corresponding vehicle demand, one, some or all of the vehicle systems 120 serve as associated vehicle systems 120. Moreover, each vehicle system 120 may be operable to perform any combination of vehicle functions, and thereby satisfy any combination of corresponding vehicle demands, in whole or in part. Accordingly, each vehicle system 120, from its own perspective, serves as an associated vehicle system 120 for one or more vehicle functions, as well as one or more corresponding vehicle demands.

In addition to the vehicle systems 120, the FCV 100 includes a sensor system 122, as well as one or more processors 124, memory 126, and one or more control modules 128 to which the vehicle systems 120 and the sensor system 122 are communicatively connected. The sensor system 122 is operable to detect information about the FCV 100. The processors 124, the memory 126 and the control modules 128 together serve as one or more computing devices whose control modules 128 are employable to orchestrate the operation of the FCV 100.

Specifically, the control modules 128 operate the vehicle systems 120 based on information about the FCV 100. Accordingly, as a prerequisite to operating the vehicle systems 120, the control modules 128 gather information about the FCV 100, including any combination of the information about the FCV 100 detected by the sensor system 122 and information about the FCV 100 communicated between the control modules 128. The control modules 128 then evaluate the information about the FCV 100, and operate the vehicle systems 120 based on their evaluation. As part of their evaluation of the information about the FCV 100, the control modules 128 identify one or more vehicle demands. Relatedly, as part of their operation of the vehicle systems 120, when a vehicle demand is identified, the control modules 128 operate one or more associated vehicle systems 120 to satisfy the vehicle demand.

Vehicle Systems. The vehicle systems 120 are part of, mounted to or otherwise supported by the body 108. The vehicle systems 120 may be housed, in whole or in part, in any combination of the passenger compartment 104, the engine compartments 106 or elsewhere in the FCV 100. Each vehicle system 120 includes one or more vehicle elements. On behalf of the vehicle system 120 to which it belongs, each vehicle element is operable to perform, in whole or in part, any combination of vehicle functions with which the vehicle system 120 is associated. It will be understood that the vehicle elements, as well as the vehicle systems 120 to which they belong, may but need not be mutually distinct.

The vehicle systems 120 include an energy system 130 and a propulsion system 132. The energy system 130 and the propulsion system 132 are electrically connected to one another. Moreover, the drivetrain is mechanically connected to the propulsion system 132. The propulsion system 132 and the drivetrain together serve as an electrified powertrain for the FCV 100. The energy system 130 is operable to perform one or more energy functions, including but limited to generating electrical energy. The propulsion system 132 is operable to perform one or more propulsion functions using electrical energy from the energy system 130, including but not limited to powering the wheels 114.

Specifically, the energy system 130 is operable to generate electrical energy, store electrical energy, condition and otherwise handle electrical energy, and store and otherwise handle fuel. In conjunction with the drivetrain, the propulsion system 132 is operable to power the wheels 114 using electrical energy from the energy system 130. With the wheels 114 powered, the propulsion system 132 is employable to accelerate the FCV 100, maintain the speed of the FCV 100 (e.g., on level or uphill ground) and otherwise drive the FCV 100 along the ground. The propulsion system 132 is also operable to generate electrical energy using one, some or all of the wheels 114, and consequently retard the wheels 114. With the wheels 114 retarded, the propulsion system 132 is employable to decelerate the FCV 100, maintain the speed of the FCV 100 (e.g., on downhill ground) and otherwise drive the FCV 100 along the ground. The energy system 130, in turn, is operable to store electrical energy from the propulsion system 132. As the combined product of generating electrical energy, and consequently retarding the wheels 114, and storing electrical energy, the propulsion system 132 and the energy system 130 are operable to regeneratively brake the FCV 100 at the wheels 114.

In addition to the energy system 130 and the propulsion system 132, the vehicle systems 120 include one or more auxiliary systems 134. The auxiliary systems 134 include a braking system 140, a steering system 142 and an accessory system 144. The auxiliary systems 134, like the propulsion system 132, are electrically connected to the energy system 130. The auxiliary systems 134 are operable to perform one or more auxiliary functions using electrical energy from the energy system 130, including but not limited to frictionally braking the FCV 100, steering the FCV 100 and one or more accessory functions. Accordingly, although the propulsion system 132 acts as the principal electrical load on the energy system 130, the auxiliary systems 134 act as electrical loads on the energy system 130 as well.

Sensor System. As part of the sensor system 122, the FCV 100 includes one or more onboard sensors. The sensors monitor the FCV 100 in real-time. The sensors, on behalf of the sensor system 122, are operable to detect information about the FCV 100, including information about user requests and information about the operation of the FCV 100.

The FCV 100 includes user controls. The user controls serve as interfaces between users of the FCV 100 and the FCV 100 itself, and are operable to receive mechanical, verbal and other user inputs requesting vehicle functions. In conjunction with corresponding user controls, and among the sensors, the FCV 100 includes an accelerator pedal sensor, a brake pedal sensor, a steering angle sensor and the like, and one or more selector sensors, one or more microphones, one or more cameras and the like. Relatedly, among information about user requests, the sensor system 122 is operable to detect user inputs requesting powering the wheels 114, user inputs requesting braking, steering and the like, as well as user inputs requesting accessory functions.

Also among the sensors, the FCV 100 includes one or more speedometers, one or more gyroscopes, one or more inclinometers, one or more accelerometers, one or more wheel sensors, one or more inertial measurement units (IMUs), one or more controller area network (CAN) sensors and the like. Relatedly, among information about the operation of the FCV 100, the sensor system 122 is operable to detect the location and motion of the FCV 100, including its speed, acceleration, orientation, rotation, direction and the like, the movement of the wheels 114, and the operational statuses of one, some or all of the vehicle systems 120.

Control Modules. As noted above, the processors 124, the memory 126 and the control modules 128 together serve as one or more computing devices whose control modules 128 orchestrate the operation of the FCV 100. The control modules 128 include a global control module 128G. Relatedly, as part of a central control system, the FCV 100 includes a global control unit (GCU) to which the global control module 128G belongs. The control modules 128 also include a power control module 128P. Relatedly, the FCV 100 includes a power control unit (PCU) to which the power control module 128P belongs. Although the FCV 100, as shown, includes one global control module 128G and one power control module 128P, it will be understood that this disclosure is applicable in principle to otherwise similar vehicles including either multiple global control modules 128G or multiple power control modules 128P, or both. Although the processors 124 and the memory 126 are shown as being common to the GCU and the PCU, it is contemplated that either the GCU or the PCU, or both, could be a standalone computing device with one or more dedicated processors 124 and dedicated memory 126.

The global control module 128G orchestrates the global operation of the FCV 100, including but not limited to the operation of the vehicle systems 120, on behalf of the GCU. The power control module 128P orchestrates the operation of the energy system 130 and the propulsion system 132, as well as certain auxiliary systems 134, on behalf of the PCU.

The processors 124 may be any components configured to execute any of the processes described herein or any form of instructions to carry out such processes or cause such processes to be performed. The processors 124 may be implemented with one or more general purpose or special purpose processors. Examples of suitable processors 124 include microprocessors, microcontrollers, digital signal processors or other forms of circuitry that execute software. Other examples of suitable processors 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 124 may include at least one hardware circuit (e.g., an integrated circuit) configured to carry out instructions contained in program code. In arrangements where there are multiple processors 124, the processors 124 may work independently from each other or in combination with one another.

The memory 126 is a non-transitory computer readable medium. The memory 126 may include volatile or nonvolatile memory, or both. Examples of suitable memory 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 126 includes stored instructions in program code. Such instructions are executable by the processors 124 or the control modules 128. The memory 126 may be part of the processors 124 or the control modules 128, or may be communicatively connected the processors 124 or the control modules 128.

Generally speaking, the control modules 128 include instructions that may be executed by the processors 124. The control modules 128 may be implemented as computer readable program code that, when executed by the processors 124, execute one or more of the processes described herein. Such computer readable program code may be stored on the memory 126. The control modules 128 may be part of the processors 124, or may be communicatively connected the processors 124.

Vehicle Systems

The energy system 130 includes a fuel cell system 160, a battery system 162 and a fuel tank system 164. The propulsion system 132 includes a motor system 166. The motor system 166 is electrically connected to the fuel cell system 160. Moreover, the battery system 162 and the fuel cell system 160 are electrically connected to one another, and the motor system 166 and the battery system 162 are electrically connected to one another. Moreover, the fuel cell system 160 is fluidly connected to the fuel tank system 164. The fuel cell system 160 is operable to generate electrical energy using electrical energy from the battery system 162 and fuel from the fuel tank system 164. In conjunction with the drivetrain, the motor system 166 is operable to power the wheels 114 using electrical energy from any combination of the fuel cell system 160 and the battery system 162. The motor system 166 is also operable to generate electrical energy using the wheels 114, and consequently retard the wheels 114. The battery system 162 is operable to store electrical energy from the fuel cell system 160. The battery system 162 is also operable to store electrical energy from the motor system 166. The fuel tank system 164 is operable to store and otherwise handle fuel, including fueling the fuel cell system 160 with fuel.

As noted above, the power control module 128P orchestrates the operation of the energy system 130 and the propulsion system 132, as well as certain auxiliary systems 134. Specifically, in the FCV 100, the power control module 128P is assigned the energy system 130 and the propulsion system 132. Moreover, the power control module 128P is assigned the auxiliary systems 134 that are electrically connected to the energy system 130. The power control module 128P orchestrates the operation of the assigned energy system 130 and the operation of the assigned propulsion system 132, as well as the operation of the assigned auxiliary systems 134.

Energy System and Propulsion System. As shown with additional reference to FIGS. 2A and 2B, in addition to the fuel cell system 160, the battery system 162 and the fuel tank system 164, the energy system 130 includes a junction box 200 and attendant energy elements. The motor system 166 is electrically connected to the fuel cell system 160 through the junction box 200. Moreover, the battery system 162 and the fuel cell system 160 are electrically connected to one another through the junction box 200, and the motor system 166 and the battery system 162 are electrically connected to one another through the junction box 200.

Figure 2A:
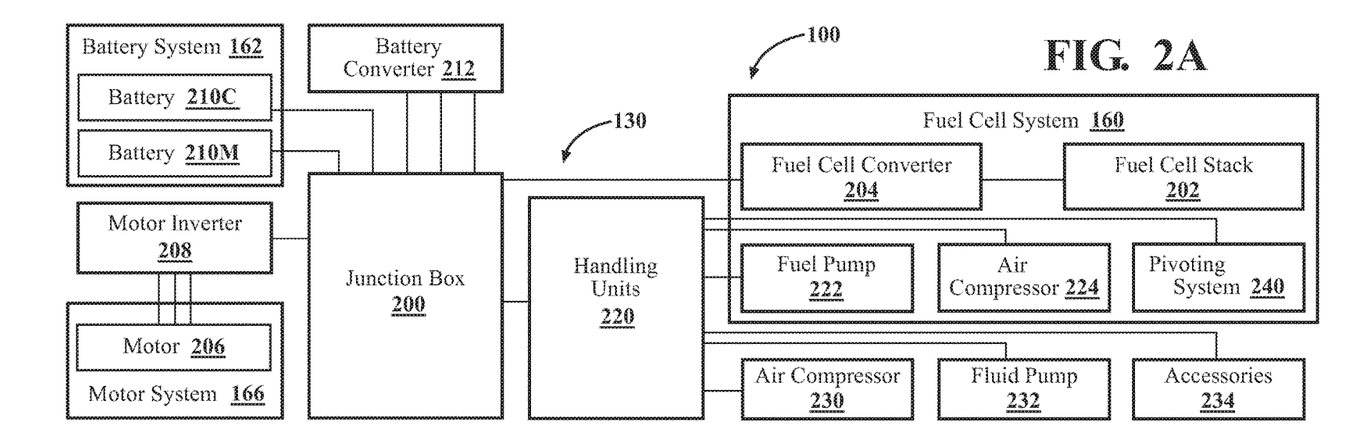
FIG. 2A is a partial portrayal of the FCV using block diagrams, further showing the energy system, with the fuel cell system including a fuel cell stack and a pivoting system, with the battery system including multiple batteries, and with the motor system including a motor.
Figure 2B:
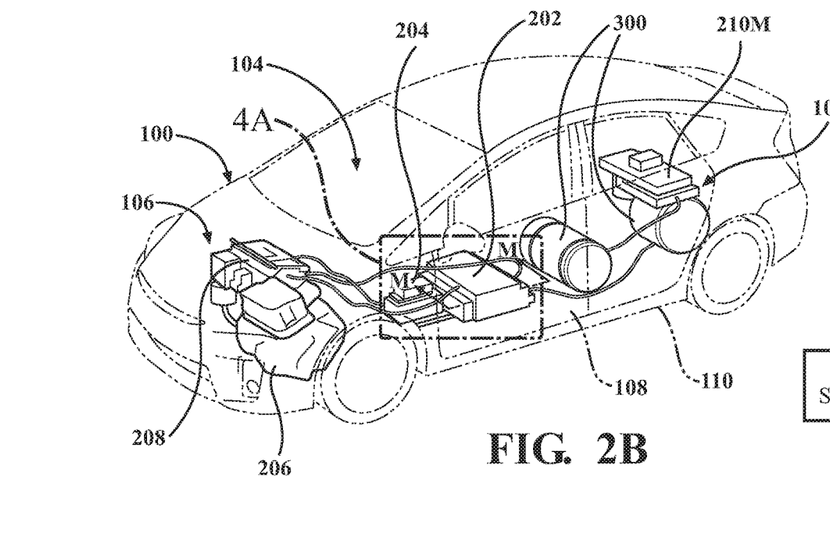
FIG. 2B is a portrayal of the FCV using a perspective view, further showing the vehicle systems.

The FCV 100 includes one or more energy elements as part of the fuel cell system 160. Among the energy elements of the fuel cell system 160, the FCV 100 includes a fuel cell stack 202. Although the FCV 100, as shown, includes one fuel cell stack 202 in the fuel cell system 160, it will be understood that this disclosure is applicable in principle to otherwise similar vehicles including multiple fuel cell stacks 202 in the fuel cell system 160. In relation to the fuel cell stack 202, among the attendant energy elements of the energy system 130, the FCV 100 includes a fuel cell converter 204. The fuel cell converter 204 is electrically connected to the fuel cell stack 202. The fuel cell stack 202 is operable to generate electrical energy. The fuel cell converter 204 is operable to condition electrical energy from the fuel cell stack 202. Specifically, the fuel cell converter 204 is a DC/DC converter operable to convert lower voltage DC electrical energy from the fuel cell stack 202 into higher voltage DC electrical energy. For instance, the lower voltage DC electrical energy may be approximately 370 VDC, and the higher voltage DC electrical energy may be approximately 650 VDC.

The FCV 100 also includes one or more propulsion elements as part of the motor system 166. Among the propulsion elements of the motor system 166, the FCV 100 includes a motor 206. Although the FCV 100, as shown, includes one motor 206 in the motor system 166, it will be understood that this disclosure is applicable in principle to otherwise similar vehicles including multiple motors 206 in the motor system 166. The motor 206 is a synchronous three-phase AC electric motor. In relation to the motor 206, among the attendant energy elements of the energy system 130, the FCV 100 includes a motor inverter 208. The motor inverter 208 is electrically connected to the fuel cell converter 204 through the junction box 200, and the motor 206 is electrically connected to the motor inverter 208. Moreover, the drivetrain is mechanically connected to the motor 206. The motor inverter 208 is operable to condition electrical energy from the fuel cell converter 204. Specifically, the motor inverter 208 is operable to convert DC electrical energy from the fuel cell converter 204 into three-phase AC electrical energy. For instance, the three-phase AC electrical energy may be approximately 650 VAC. In conjunction with the drivetrain, the motor 206 is operable to power the wheels 114 using electrical energy from the motor inverter 208.

The FCV 100 also includes one or more energy elements as part of the battery system 162. Among the energy elements of the battery system 162, the FCV 100 includes one or more batteries 210. Although the FCV 100, as shown, includes two batteries 210 in the battery system 162, it will be understood that this disclosure is applicable in principle to otherwise similar vehicles including one battery 210 in the battery system 162, as well as otherwise similar vehicles otherwise including multiple batteries 210 in the battery system 162. In relation to the batteries 210, among the attendant energy elements of the energy system 130, the FCV 100 includes a battery converter 212. From the perspective of the fuel cell system 160, the battery converter 212 is electrically connected to the fuel cell converter 204 through the junction box 200, and the batteries 210 are electrically connected to the battery converter 212 through the junction box 200. The battery converter 212 is operable to condition electrical energy from the fuel cell converter 204. Specifically, the battery converter 212 is a DC/DC converter operable to convert higher voltage DC electrical energy from the fuel cell converter 204 into lower voltage DC electrical energy. For instance, the higher voltage DC electrical energy may be approximately 650 VDC, and the lower voltage DC electrical energy may be approximately 288 VDC. The batteries 210 are operable to store electrical energy from the battery converter 212.

Also, from the perspective of the battery system 162, the battery converter 212 is electrically connected to the batteries 210 through the junction box 200, the motor inverter 208 is electrically connected to the battery converter 212 through the junction box 200 and, as noted above, the motor 206 is electrically connected to the motor inverter 208. Relatedly, the battery converter 212 is also operable to condition electrical energy from the batteries 210. Specifically, the battery converter 212 is a DC/DC converter operable to convert lower voltage DC electrical energy from the batteries 210 into higher voltage DC electrical energy. For instance, the lower voltage DC electrical energy may be approximately 288 VDC, and the higher voltage DC electrical energy may be approximately 650 VDC. The motor inverter 208 is also operable to condition electrical energy from the battery converter 212. Specifically, the motor inverter 208 is operable to convert DC electrical energy from the battery converter 212 into three-phase AC electrical energy. As noted above, the three-phase AC electrical energy may be approximately 650 VAC. Once again, in conjunction with the drivetrain, the motor 206 is operable to power the wheels 114 using electrical energy from the motor inverter 208.

Similarly, from the perspective of the motor system 166, the motor inverter 208 is electrically connected to the motor 206, the battery converter 212 is electrically connected to the motor inverter 208 through the junction box 200 and, as noted above, the batteries 210 are electrically connected to the battery converter 212 through the junction box 200. Relatedly, in conjunction with the drivetrain, the motor 206 is also operable to generate electrical energy using the wheels 114, and consequently retard the wheels 114. Moreover, the motor inverter 208 is also operable to condition electrical energy from the motor 206. Specifically, the motor inverter 208 is operable to convert three-phase AC electrical energy from the motor 206 into DC electrical energy. For instance, the three-phase AC electrical energy may be approximately 650 VAC, and the DC electrical energy may be approximately 650 VDC. The battery converter 212 is also operable to condition electrical energy from the motor inverter 208 in the same manner as electrical energy from the fuel cell converter 204. Once again, the batteries 210 are operable to store electrical energy from the battery converter 212. As the combined product of generating electrical energy, consequently retarding the wheels 114 and storing electrical energy, the motor 206 and the batteries 210 are operable to regeneratively brake the FCV 100 at the wheels 114.

Among other things, it follows that the motor 206 is operable to power the wheels 114 using electrical energy from any combination of the fuel cell stack 202 and the batteries 210. Moreover, the batteries 210 are operable to store electrical energy from the fuel cell stack 202. In a fuel-cell-powered implementation, the motor 206 principally powers the wheels 114 using electrical energy from the fuel cell stack 202. In cases of shortages, the motor 206 powers the wheels 114 using a combination of electrical energy from the fuel cell stack 202 and supplementary electrical energy from the batteries 210. On the other hand, in cases of surpluses, the motor 206 powers the wheels 114 using some electrical energy from the fuel cell stack 202, and the batteries 210 store the remaining electrical energy from the fuel cell stack 202.

Also among the attendant energy elements of the energy system 130, the FCV 100 includes one or more handling units 220. The handling units 220 are electrically connected to the batteries 210 through the junction box 200. The handling units 220 may include one or more power supplies (e.g., one or more DC power supplies), one or more inverters, one or more converters (e.g., one or more DC/DC converters) and the like. The handling units 220 are operable to condition and otherwise handle electrical energy from the batteries 210, including but not limited to distributing electrical energy from the batteries 210 and conditioning electrical energy from the batteries 210 (e.g., converting DC electrical energy from the batteries 210 into three-phase AC electrical energy, converting higher voltage DC electrical energy from the batteries 210 into lower voltage DC electrical energy, etc.).

As noted above, the FCV 100 includes the fuel cell stack 202 among the energy elements of the fuel cell system 160. Also among the energy elements of the fuel cell system 160, the FCV 100 includes a fuel pump 222. The fuel pump 222 is electrically connected to the handling units 220. Moreover, the fuel pump 222 is fluidly connected to the fuel tank system 164, and the fuel cell stack 202 is fluidly connected to the fuel pump 222. The fuel pump 222 is operable to pump fuel from the fuel tank system 164 into the fuel cell stack 202 using electrical energy from the handling units 220.

Also among the energy elements of the fuel cell system 160, the FCV 100 includes an air compressor 224. The air compressor 224 is electrically connected to the handling units 220. Moreover, in addition to being fluidly connected to the fuel pump 222, the fuel cell stack 202 is pneumatically connected to the air compressor 224. The air compressor 224 is operable to pump air into the fuel cell stack 202 using electrical energy from the handling units 220.

The fuel cell stack 202 includes one or more fuel cells. The fuel cell stack 202 is operable to employ the fuel cells to execute a chemical reaction that combines fuel from the fuel pump 222 with oxygen in air from the air compressor 224, and generates electrical energy. Accordingly, as the combined product of pumping fuel into the fuel cell stack 202, pumping air into the fuel cell stack 202 and executing the chemical reaction, the fuel pump 222, the air compressor 224 and the fuel cell stack 202 are operable to generate electrical energy using fuel from the fuel tank system 164 and air.

Auxiliary Systems. The auxiliary systems 134 are electrically connected to battery system 162 through the junction box 200. The FCV 100 includes one or more auxiliary elements as part of the braking system 140. Among the auxiliary elements of the braking system 140, the FCV 100 includes an air compressor 230, as well as one or more friction brakes at one, some or all of the wheels 114. The air compressor 230 is electrically connected to the handling units 220. The friction brakes are pneumatically connected to the air compressor 230, and the wheels 114 are mechanically connected to the friction brakes. The air compressor 230 is operable to pump air into the friction brakes using electrical energy from the handling units 220. The friction brakes are operable to frictionally brake the FCV 100 at the wheels 114 using air from the air compressor 230.

The FCV 100 also includes one or more auxiliary elements as part of the steering system 142. Among the auxiliary elements of the steering system 142, the FCV 100 includes a fluid pump 232, as well as one or more steering mechanisms at one, some or all of the wheels 114. The fluid pump 232 is electrically connected to the handling units 220. The steering mechanisms are hydraulically connected to the fluid pump 232, and the wheels 114 are mechanically connected to the steering mechanisms. The fluid pump 232 is operable to pump power steering fluid into the steering mechanisms using electrical energy from the handling units 220. The steering mechanisms are operable to adjust the steering angle of the wheels 114 using power steering fluid from the fluid pump 232. In a front-wheel steer arrangement, one steering system 142 is operable to adjust the steering angle of both front wheels 114F using power steering fluid from the fluid pump 232. By doing this, the steering mechanisms are operable to steer the FCV 100 as it drives along the ground.

The FCV 100 also includes one or more auxiliary elements as part of the accessory system 144. Among the auxiliary elements of the accessory system 144, the FCV 100 includes one or more accessories 234. The accessories 234 are typical of vehicles, and include any combination of one or more interior lights, one or more exterior lights, one or more gauges, one or more power seats, one or more infotainment systems and the like. The accessories 234 are electrically connected to the handling units 220. The accessories 234 are operable to illuminate the passenger compartment 104, illuminate the environment surrounding the FCV 100, signal driving intentions, deliver information about the operation of the FCV 100, adjust the position of seats in the FCV 100, deliver infotainment content to users of the FCV 100 and otherwise perform accessory functions using electrical energy from the handling units 220.

With the FCV 100 including multiple batteries 210 in the battery system 162, the batteries 210 include one or more motor batteries 210M or, in other words, batteries 210 dedicated to handling the electrical loads on the battery system 162 from the motor system 166. The electrical loads from the motor system 166 include those from the motor 206. Relatedly, the batteries 210 also include one or more complementary batteries 210C dedicated to handling the remaining electrical loads on the battery system 162. The remaining electrical loads on the battery system 162 include those from the remainder of the energy system 130 besides the motor system 166, including those from the fuel cell system 160, as well as those from the auxiliary systems 134.

Fueling the FCV. As shown with additional reference to FIG. 3, the FCV 100 also includes one or more energy elements as part of the fuel tank system 164. Among the energy elements of the fuel tank system 164, the FCV 100 includes one or more fuel tanks 300, as well as a piping network 302 for the fuel tanks 300. Although the FCV 100, as shown, includes two fuel tanks 300 in the fuel tank system 164, it will be understood that this disclosure is applicable in principle to otherwise similar vehicles including one fuel tank 300 in the fuel tank system 164, as well as otherwise similar vehicles otherwise including multiple fuel tanks 300 in the fuel tank system 164. As noted above, the fuel cell stack 202, by the employment of fuel cells, is operable to generate electrical energy using fuel from the fuel tank system 164 and air. In a hydrogen-fueled implementation, the fuel is hydrogen fuel. Relatedly, each fuel tank 300 is a high-pressure hydrogen tank, and the piping network 302 is a hydrogen piping network 302. The fuel tanks 300 are operable to store fuel.

Figure 3:
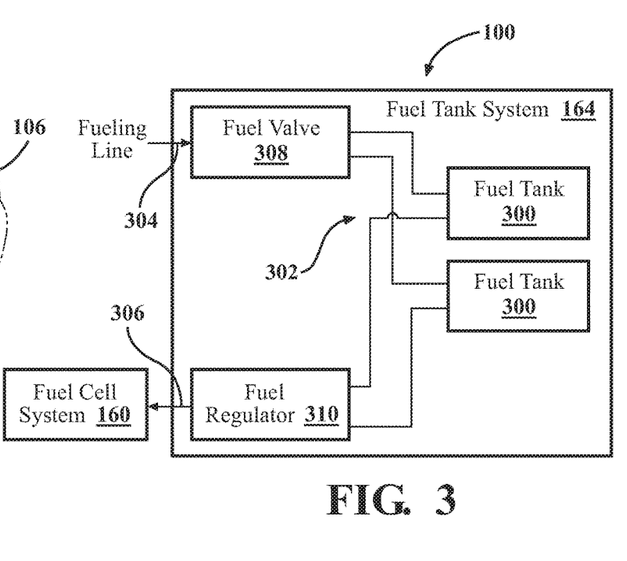
FIG. 3 is a partial portrayal of the FCV using block diagrams, further showing the energy system, with the fuel tank system including multiple fuel tanks and a piping network for the fuel tanks.

From the perspective of the fuel tanks 300, the piping network 302 has an input line 304 and an output line 306. On the input line 304, in addition to the requisite pipes, the piping network 302 includes a fuel valve 308. The fuel valve 308 is fluidly connectable to a fueling station's fueling line, and each fuel tank 300 is fluidly connected to the fuel valve 308. The fuel valve 308 is operable to selectively open or close the input line 304 to one, some or all of the fuel tanks 300.

With the fuel valve 308 fluidly connected to a fueling line, as the product of opening the input line 304 to one, some or all of the fuel tanks 300, the fuel valve 308 is operable to open a fluid connection from the fueling line to one, some or all of the fuel tanks 300. From the perspective of each fuel tank 300, with a fluid connection opened from the fueling line to the fuel tank 300, the piping network 302 is employable to fill the fuel tank 300 with fuel from the fueling line. Moreover, with a fluid connection opened from the fueling line to multiple fuel tanks 300, the piping network 302 is employable to simultaneously fill the fuel tanks 300 with fuel from the fueling line.

On the output line 306, in addition to the requisite pipes, the piping network 302 includes a fuel regulator 310. The fuel regulator 310 is fluidly connected to each fuel tank 300, and the fuel cell system 160, at the fuel pump 222, is fluidly connected to the fuel regulator 310. The fuel regulator 310 is operable to selectively open or close the output line 306 from one, some or all of the fuel tanks 300. Moreover, the fuel regulator 310 is operable to regulate the properties of fuel in the output line 306. Specifically, the fuel regulator 310 is a pressure regulator operable to regulate the pressure of fuel in the output line 306.

As the product of opening the output line 306 from one, some or all of the fuel tanks 300, the fuel regulator 310 is operable to open a fluid connection from one, some or all of the fuel tanks 300 to the fuel cell system 160. From the perspective of each fuel tank 300, with a fluid connection opened from the fuel tank 300 to the fuel cell system 160, the piping network 302 is employable to fuel the fuel cell system 160 with fuel from the fuel tank 300. Moreover, with a fluid connection opened from multiple fuel tanks 300 to the fuel cell system 160, the piping network 302 is employable to simultaneously fuel the fuel cell system 160 with fuel from the fuel tanks 300.

Fuel Cell System

As noted above, the fuel cell stack 202, by the employment of fuel cells, is operable to generate electrical energy using hydrogen fuel from the fuel tank system 164 and air. As shown with additional reference to FIGS. 4A and 4B, fuel cell stack 202 includes multiple fuel cells 400 arranged in a stacked setup. In the fuel cell stack 202, each fuel cell 400 includes an anode and a cathode. In each fuel cell 400, hydrogen fuel is pumped to the anode where, as part of the chemical reaction executed by the fuel cell 400, hydrogen molecules are activated by an anode catalyst. The hydrogen molecules thereby release electrons, and become hydrogen ions. The released electrons travel from the anode to the cathode, thereby generating electrical current. The electrical current generated by the fuel cells 400 serves as the electrical energy generated by the fuel cell stack 202. In each fuel cell 400, the hydrogen ions also travel from the anode to the cathode. Oxygen in air from the air compressor 224 is pumped to the cathode where, as part of the chemical reaction, the hydrogen ions bond with oxygen on a cathode catalyst to generate water. In the fuel cell stack 202, the water generated by the fuel cells 400 is a byproduct of generating electrical energy.

Figure 4A:
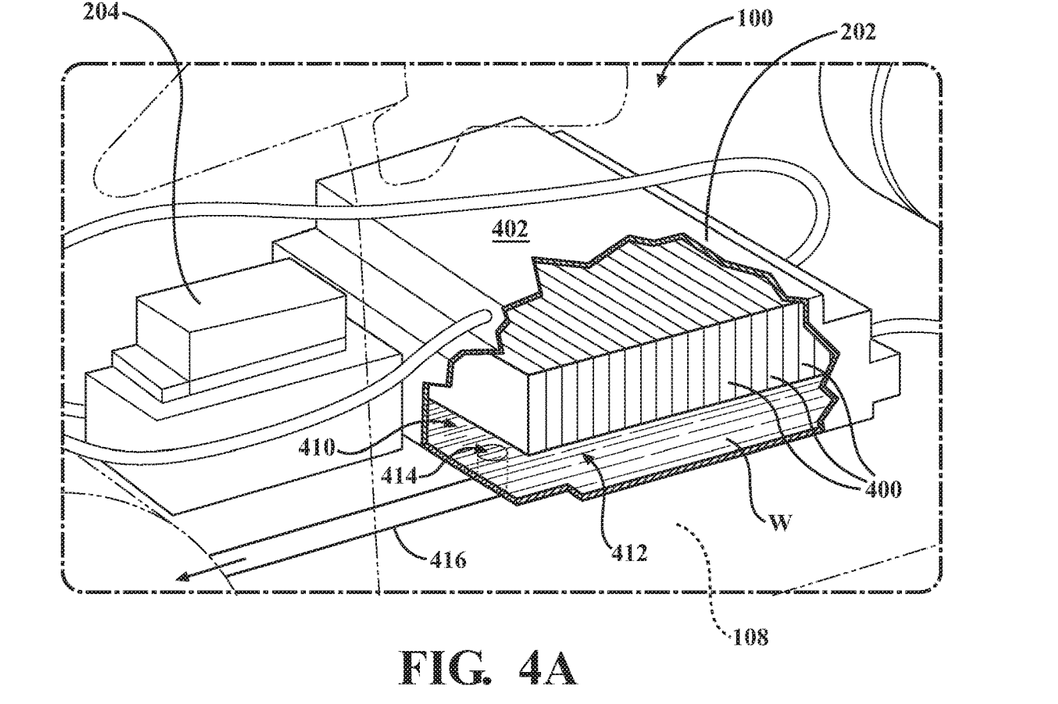
FIG. 4A is a perspective view of the fuel cell stack identified in FIG. 2B, showing fuel cells and a water exhaust system, with the water exhaust system including an exhaust water collector and an exhaust water drainage port.

In the FCV 100, the fuel cell stack 202 is mounted to or otherwise supported by the body 108 as a unitary module. The fuel cells 400 are internal to the fuel cell stack 202. Specifically, in addition to the fuel cells 400, the fuel cell stack 202 includes an enclosed exterior casing 402, and the fuel cells 400 are housed by the casing 402. The fuel cell stack 202 may also include one or more internal vehicle elements attendant to the fuel cells 400. For instance, the fuel cell stack 202 may include any combination of one or more hydrogen fuel passages opening to the anodes, one or more air passages opening to the cathodes, one or more coolant passages and the like housed by the casing 402.

In the operation of the fuel cell stack 202, the water generated by the fuel cells 400 is manifested as humidity, water and otherwise as water moisture. With the fuel cells 400 housed by the casing 402, the water generated by the fuel cells 400 is manifested as water moisture around the fuel cells 400 or, in other words, water moisture in the casing 402 in the same space as the fuel cells 400.

The operation of the fuel cell stack 202 is promoted by a certain amount of water moisture around the fuel cells 400. Accordingly, some of the water generated by the fuel cells 400 may be retained or otherwise reused as water moisture around the fuel cells 400. For instance, humidity around the fuel cells 400 improves their performance. Specifically, humidity around the fuel cells 400 wets the fuel cells 400. And, when the fuel cells 400 are wetted, in each fuel cell 400, the hydrogen ions travel from the anode to the cathode more easily than when the fuel cell 400 is dry. Accordingly, with humidifying hydrogen fuel being one way to realize humidity around the fuel cells 400, and thereby wet the fuel cells 400, some of the water generated by the fuel cells 400 may be reused to humidify hydrogen fuel.

On the other hand, the operation of the fuel cell stack 202 is frustrated by excess water moisture around the fuel cells 400. For instance, excess water around the fuel cells 400 worsens their performance. Specifically, excess water around the fuel cells 400 collects on the cathodes. And, when water collects on the cathodes, in each fuel cell 400, pumping air to the cathode is more difficult than when water is not collected on the cathode. Accordingly, although some of the water generated by the fuel cells 400 may be reused as water moisture around the fuel cells 400, to eliminate the prospect of frustrating the operation of the fuel cell stack 202, the water generated by the fuel cells 400 is otherwise discharged from around the fuel cells 400 as exhaust water W.

Specifically, in addition to the fuel cells 400, the fuel cell stack 202 includes a water exhaust system 410 operable to discharge the exhaust water W from around the fuel cells 400. The water exhaust system 410 includes an internal exhaust water collector 412, an exhaust water drainage port 414 on the exhaust water collector 412, and an external exhaust water discharge line 416 connected over the exhaust water drainage port 414. The exhaust water collector 412 is housed by the casing 402 in the same space as the fuel cells 400 or otherwise in fluid communication with the fuel cells 400. The exhaust water collector 412 has the requisite structure for storing, holding, passing or otherwise collecting the exhaust water W. Downstream of the fuel cells 400, the exhaust water drainage port 414 is in fluid communication with the exhaust water collector 412, and the exhaust water discharge line 416 is in fluid communication with the exhaust water drainage port 414. The exhaust water discharge line 416 leads away from the exhaust water collector 412, and opens outside the exhaust water collector 412. Specifically, the exhaust water discharge line 416 opens outside the casing 402 and the remainder of the fuel cell stack 202 to the environment surrounding the FCV 100.

In the operation of the fuel cell stack 202, and by the operation of the water exhaust system 410, in the casing 402, the exhaust water W is passed from around the fuel cells 400 to the exhaust water collector 412. Downstream of the fuel cells 400, the exhaust water W collects in the exhaust water collector 412. The exhaust water W is passed from the exhaust water collector 412 to the exhaust water drainage port 414, and from the exhaust water drainage port 414 to the exhaust water discharge line 416. From the exhaust water discharge line 416, the exhaust water W is discharged to the environment surrounding the FCV 100 or otherwise outside the exhaust water collector 412. As the product of passing the exhaust water W from around the fuel cells 400 to outside the exhaust water collector 412, the exhaust water W is discharged from around the fuel cells 400.

Figure 4B:
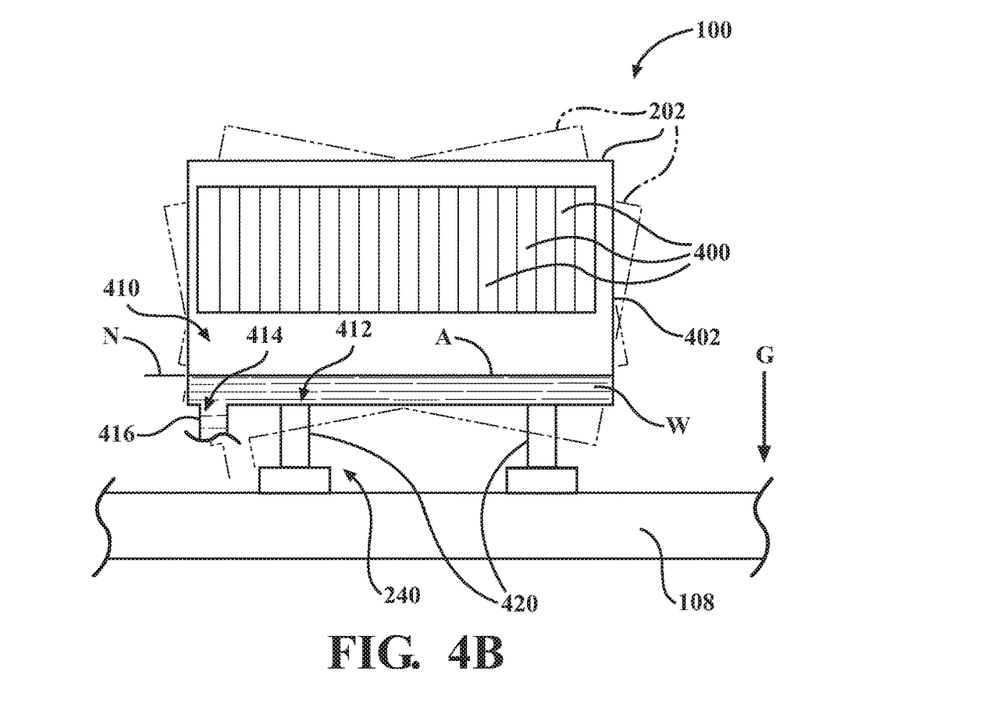
FIG. 4B is a cross section of the FCV across the line M-M in FIG. 2B, showing the body, the fuel cell stack and the pivoting system, with the exhaust water drainage port below a nominal exhaust water level.

In relation to its collection of the exhaust water W, the exhaust water collector 412 has a nominal exhaust water level N or, in other words, a predetermined level of the exhaust water W therein. The nominal exhaust water level N is local to the exhaust water collector 412. With the exhaust water drainage port 414 on the exhaust water collector 412, the exhaust water drainage port 414 is local to the exhaust water collector 412 as well. On the exhaust water collector 412, for purposes of passing the exhaust water W from the exhaust water collector 412 to the exhaust water drainage port 414, the exhaust water drainage port 414 is spaced apart from the nominal exhaust water level N. Specifically, the exhaust water drainage port 414 is below the nominal exhaust water level N. Equally, the nominal exhaust water level N is above the exhaust water drainage port 414.

In the operation of the FCV 100, many vehicle elements of the vehicle systems 120, including the exhaust water collector 412 of the fuel cell system 160, are anticipated as being level or, in other words, perpendicular to the gravity direction G. However, many such vehicle elements, either individually or as part of the vehicle systems 120 to which they belong, also become inclined or, in other words, tilted from the gravity direction G. Specifically, with the vehicle systems 120 supported by the body 108, many of the vehicle elements are susceptible to assuming the inclination of the body 108. And, as is the case for many ground-supported items, the FCV 100, and the body 108 in particular, assume the inclination of the ground. Accordingly, when the FCV 100 drives along level ground, the body 108 will be level. And, with the susceptible vehicle elements assuming the inclination of the body 108, the susceptible vehicle elements will be level as well. On the other hand, when the FCV 100 drives along any combination of uphill, downhill, canted and otherwise inclined ground, the body 108 will be inclined. And, with the susceptible vehicle elements assuming the inclination of the body 108, the susceptible vehicle elements will be inclined as well.

As noted above, on the exhaust water collector 412, the nominal exhaust water level N is above the exhaust water drainage port 414. In addition to the nominal exhaust water level N, it is contemplated that the exhaust water collector 412 has an actual exhaust water level A or, in other words, the real-time level of the exhaust water W therein. Rather than being local to the exhaust water collector 412, the actual exhaust water level A is local to the exhaust water W. Accordingly, while the nominal exhaust water level N, being local to the exhaust water collector 412, assumes the inclination of the exhaust water collector 412, the actual exhaust water level A, being local to the exhaust water W, is level regardless of the inclination of the exhaust water collector 412. Among other things, it follows that, while the actual exhaust water level A is above the exhaust water drainage port 414 when the exhaust water collector 412 is level, in principle, the actual exhaust water level A could fall below the exhaust water drainage port 414 if the exhaust water collector 412 was inclined.

Specifically, when the exhaust water collector 412 is level, the actual exhaust water level A corresponds to the nominal exhaust water level N. Moreover, with the nominal exhaust water level N being above the exhaust water drainage port 414, the actual exhaust water level A is above the exhaust water drainage port 414 as well. And, when the actual exhaust water level A is above the exhaust water drainage port 414, the exhaust water W passes from the exhaust water collector 412 to the exhaust water drainage port 414. On the other hand, if the exhaust water collector 412 was inclined, the actual exhaust water level A would decreasingly correspond to the nominal exhaust water level N. Moreover, if the exhaust water collector 412 was inclined away from the exhaust water drainage port 414, the actual exhaust water level A, unlike the nominal exhaust water level N, could fall below the exhaust water drainage port 414. And, if the actual exhaust water level A fell below the exhaust water drainage port 414, the exhaust water W would not pass from the exhaust water collector 412 to the exhaust water drainage port 414.

If the exhaust water collector 412 was susceptible to assuming the inclination of the body 108, when the body 108 is inclined, the exhaust water collector 412 would be inclined as well. If the exhaust water collector 412 was inclined, the actual exhaust water level A could fall below the exhaust water drainage port 414. If the actual exhaust water level A fell below the exhaust water drainage port 414, with the exhaust water W not passing from the exhaust water collector 412 to the exhaust water drainage port 414, the exhaust water W would not be discharged from around the fuel cells 400 by the operation of the water exhaust system 410. And, if the exhaust water W was not discharged from around the fuel cells 400, the operation of the fuel cell stack 202 would be frustrated.

In the FCV 100, however, the exhaust water collector 412 does not necessarily assume the inclination of the body 108. Instead, as shown with additional reference once again to FIGS. 2A and 2B, also among the energy elements of the fuel cell system 160, the FCV 100 includes a pivoting system 240 for the exhaust water collector 412. The pivoting system 240 is electrically connected to handling units 220. In relation to the pivoting system 240, the exhaust water collector 412 is supported by the body 108 for pivotation or, in other words, tilting relative the body 108. The pivoting system 240 is mechanically connected to the body 108, and the exhaust water collector 412 is mechanically connected to the pivoting system 240. With the pivoting system 240 thus mechanically connected between the body 108 and the exhaust water collector 412, the pivoting system 240 is operable to selectively pivot the exhaust water collector 412 using electrical energy from the handling units 220. As the product of pivoting the exhaust water collector 412, the pivoting system 240 is employable to adjust the inclination of the exhaust water collector 412 apart from the inclination of the body 108. Relatedly, when the body 108 is inclined, the pivoting system 240 is employable to level the exhaust water collector 412 notwithstanding the body 108 being inclined.

The pivoting system 240 includes one or more actuators 420 operable to selectively impart pivotation to the exhaust water collector 412. Each actuator 420 may be operable to impart pivotation to the exhaust water collector 412 either by itself or in conjunction with one, some or all of the remaining actuators 420. Each actuator 420 may be operable to either raise or lower, or both, one or more sides of the exhaust water collector 412 relative to the remaining sides of the exhaust water collector 412. Additionally, or alternatively, each actuator 420 may be operable to either raise or lower, or both, one or more corners of the exhaust water collector 412 relative to the remaining corners of the exhaust water collector 412. As supported by the body 108, and by the operation of the pivoting system 240, the exhaust water collector 412 may be pivoted in any combination of directions, including but not limited to the exhaust water collector 412 being pivoted toward the exhaust water drainage port 414. For instance, the exhaust water collector 412 may be pivoted under any combination of forward pivoting, rearward pivoting and sideways pivoting, including forward-only pivoting, rearward-only pivoting or sideways-only pivoting.

As noted above, the exhaust water collector 412 is supported by the body 108 for pivotation, and the pivoting system 240 is mechanically connected between the body 108 and the exhaust water collector 412. Specifically, in relation to the pivoting system 240, the exhaust water collector 412, as part of the fuel cell stack 202 to which it belongs, assumes the inclination of the fuel cell stack 202. Relatedly, the pivoting system 240 is mounted to the body 108, and the fuel cell stack 202 is mounted to the pivoting system 240 as a unitary module. Moreover, with the pivoting system 240 thus mounted between the body 108 and the fuel cell stack 202, the pivoting system 240 supports the fuel cell stack 202 for pivotation, and is operable to selectively pivot the fuel cell stack 202. And, with the exhaust water collector 412 assuming the inclination of the fuel cell stack 202, as the product of pivoting the fuel cell stack 202, the pivoting system 240 is operable to pivot the exhaust water collector 412 as well.

Operating the FCV

As noted above, the vehicle systems 120 are operable to perform vehicle functions on behalf of the FCV 100, and thereby satisfy corresponding vehicle demands on behalf of the FCV 100. Specifically, the energy system 130 is operable to perform energy functions, and thereby satisfy corresponding energy demands, the propulsion system 132 is operable to perform propulsion functions, and thereby satisfy corresponding propulsion demands, and the auxiliary systems 134 are operable to perform auxiliary functions, and thereby satisfy corresponding auxiliary demands.

The energy demands may include any combination of one or more demands to generate electrical energy, including one or more demands to generate electrical energy using fuel from the fuel tank system 164 and air, one or more demands to store electrical energy, including one or more demands to store electrical energy from the fuel cell stack 202, one or more demands to condition and otherwise handle electrical energy, one or more demands to store and otherwise handle fuel, one or more demands to discharge the exhaust water W from around the fuel cells 400, and one or more demands to pivot the exhaust water collector 412. The propulsion demands may include one or more demands to power the wheels 114, including one or more demands to power the wheels 114 using electrical energy from any combination of the fuel cell stack 202 and the batteries 210, and one or more demands to retard the wheels 114. Any combination of the energy demands and the propulsion demands may be part of combined energy and propulsion demands, such as one or more demands to regeneratively brake the FCV 100. The auxiliary demands may include any combination of one or more demands to frictionally brake the FCV 100, one or more demands to steer the FCV 100 and one or more demands to perform accessory functions.

Figure 5:
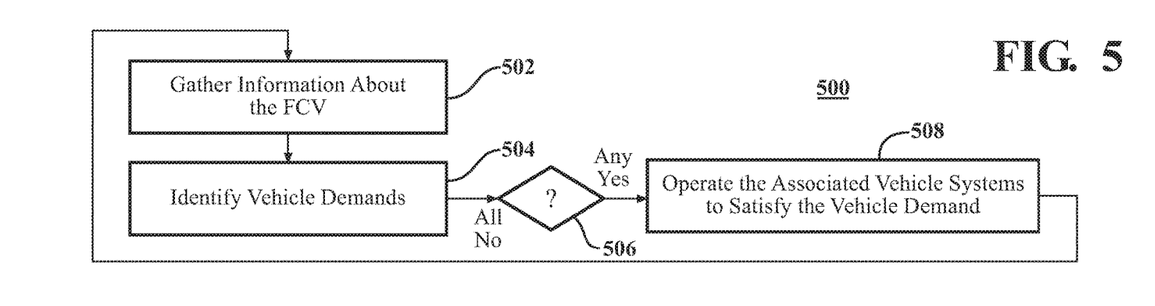
FIG. 5 is a flowchart showing the operations of a process by which the control modules orchestrate the operation of the FCV.

The FCV 100 is equipped, in operation, to perform vehicle functions on behalf of the FCV 100, and thereby satisfy corresponding vehicle demands on behalf of the FCV 100. The operations of a process 500 for operating the FCV 100 under the orchestration of the control modules 128 are shown in FIG. 5. According to the process 500, the control modules 128 orchestrate the operation of the FCV 100. The operations of the process 500 are applicable in principle to any combination of the control modules 128 in relation to any combination of the vehicle demands.

In operation 502, the control modules 128 gather information about the FCV 100, including any combination of the information about the FCV 100 detected by the sensor system 122 and information about the FCV 100 communicated between the control modules 128. In operation 504, the control modules 128 evaluate the information about the FCV 100, including monitoring for and identifying one or more vehicle demands. Any combination of control modules 128 may be tasked with the first instance of identifying a vehicle demand. Accordingly, from the perspective of a control module 128, an identified vehicle demand may have been self-identified by the control module 128, identified by the control module 128 and one or more collaborating control modules 128, or communicated from one or more originating control modules 128.

In operations 506 and 508, the control modules 128 operate the vehicle systems 120 based on their evaluation of the information about the FCV 100. Specifically, when, in operation 506, the control modules 128 do not identify a vehicle demand, the control modules 128 do not operate the associated vehicle systems 120. Otherwise, when the control modules 128 identify a vehicle demand in operation 506, in operation 508, the control modules 128 operate the associated vehicle systems 120 to satisfy the vehicle demand. For instance, when the control modules 128 identify an energy demand in operation 506, the control modules 128 operate the energy system 130 to satisfy the energy demand in operation 508. And, when the control modules 128 identify a propulsion demand in operation 506, the control modules 128 operate the propulsion system 132 to satisfy the propulsion demand in operation 508. Moreover, when the control modules 128 identify an auxiliary demand in operation 506, the control modules 128 operate the auxiliary systems 134 to satisfy the auxiliary demand in operation 508.

In both cases, the control modules 128 continue to gather information about the FCV 100 according to operation 502, and continue to evaluate the information about the FCV 100 according to operation 504. Following not operating the vehicle systems 120, as part of their continued evaluation of the information about the FCV 100 according to operation 504, the control modules 128 continue to identify vehicle demands in anticipation that previously-unidentified vehicle demands will materialize. On the other hand, following operating the associated vehicle systems 120 to satisfy the vehicle demand according to operation 508, as part of their continued evaluation of the information about the FCV 100 according to operation 504, the control modules 128 continue to identify vehicle demands in anticipation that the previously-identified vehicle demand will be satisfied. When the previously-identified vehicle demand is satisfied, and the previously-identified vehicle demand is thus no longer identified according to operation 504, the control modules 128 conclude operating the associated vehicle systems 120.

Also as part of their continued evaluation of the information about the FCV 100 according to operation 504, the control modules 128 conduct operational status checks on one or more of the vehicle systems 120, including one, some or all of the associated vehicle systems 120. When one or more associated vehicle systems 120 fail an operational status check, the control modules 128 may conclude operating the inoperative associated vehicle systems 120. The control modules 128 may also conclude operating one, some or all of the remaining, still-operable associated vehicle systems 120, if any, as well as one or more vehicle systems 120 attendant to the inoperative associated vehicle systems 120.

For purposes of identifying vehicle demands, conducting operational status checks on the vehicle systems 120 and otherwise evaluating information about the FCV 100 according to operation 504, the control modules 128 may gather any combination of information about user requests and information about the operation of the FCV 100. This and other information about the FCV 100 may be detected by the sensor system 122. The information about user requests may include any combination of user inputs requesting powering the wheels 114, user inputs requesting braking, steering and the like, as well as user inputs requesting accessory functions. The information about the operation of the FCV 100 may include any combination of the location and motion of the FCV 100, the movement of the wheels 114, and the operational statuses of one, some or all of the vehicle systems 120.

Figure 6:
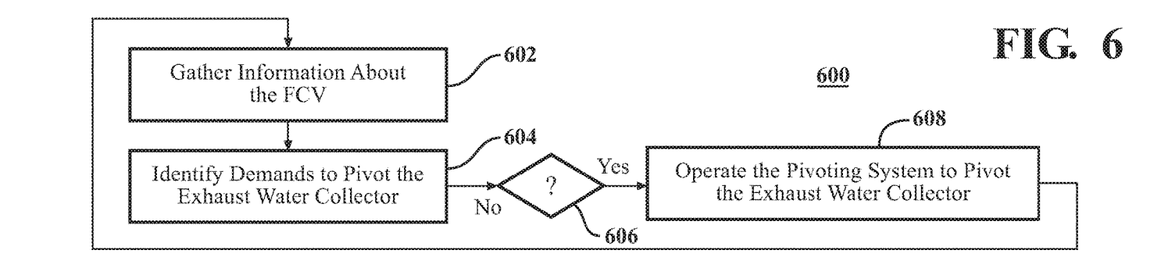
FIG. 6 is a flowchart showing the operations of a process by which the control modules orchestrate the operation of the FCV during inclination events.

Inclination Events. In furtherance to the operations of the process 500, the operations of a process 600 for operating the FCV 100 during inclination events are shown in FIG. 6. According to the process 600, the control modules 128 orchestrate the operation of the FCV 100 during inclination events, including but not limited to operating the pivoting system 240.

In operation 602, the control modules 128 gather information about the FCV 100. For purposes of identifying demands to pivot the exhaust water collector 412, the control modules 128 gather information about the operation of the FCV 100, including any combination of the location and motion of the FCV 100 and the operational statuses of the vehicle systems 120.

In operation 604, the control modules 128 evaluate the information about the FCV 100, including monitoring for and identifying one or more demands to pivot the exhaust water collector 412. Specifically, informed of the location and motion of the FCV 100, the control modules 128 identify inclination events or, in other words, events associated with the FCV 100, and the body 108 in particular, evidently or prospectively being inclined. The identification of an inclination event includes identifying the body 108 being inclined away from the exhaust water drainage port 414, including identifying the extent of the body 108 being inclined away from the exhaust water drainage port 414. Informed of the operational statuses of the vehicle systems 120, the control modules 128 identify one or more operation events for the fuel cell stack 202 or, in other words, events associated with the fuel cell stack 202 evidently or prospectively being operated to satisfy demands to generate electrical energy using fuel from the fuel tank system 164 and air. Moreover, the control modules 128 identify the water exhaust system 410 failing an operational status check.

Generally speaking, an inclination event corresponds to a demand to pivot the exhaust water collector 412. Given an inclination event, the corresponding demand to pivot the exhaust water collector 412 may be conditioned upon any combination of the body 108 being inclined away from the exhaust water drainage port 414, including the body 108 being inclined away from the exhaust water drainage port 414 to an extent associated with the actual exhaust water level A falling below the exhaust water drainage port 414 if the exhaust water collector 412 assumed the inclination of the body 108, an operation event for the fuel cell stack 202, and the water exhaust system 410 failing an operational status check.

In operations 606 and 608, the control modules 128 operate the pivoting system 240 based on their evaluation of the information about the FCV 100. Specifically, when, in operation 606, the control modules 128 do not identify an inclination event, or otherwise do not identify a demand to pivot the exhaust water collector 412, the control modules 128 do not operate the pivoting system 240. Otherwise, when the control modules 128 identify an inclination event and the corresponding demand to pivot the exhaust water collector 412 in operation 606, in operation 608, the control modules 128 operate the pivoting system 240 to satisfy the demand to pivot the exhaust water collector 412.

Figure 7:
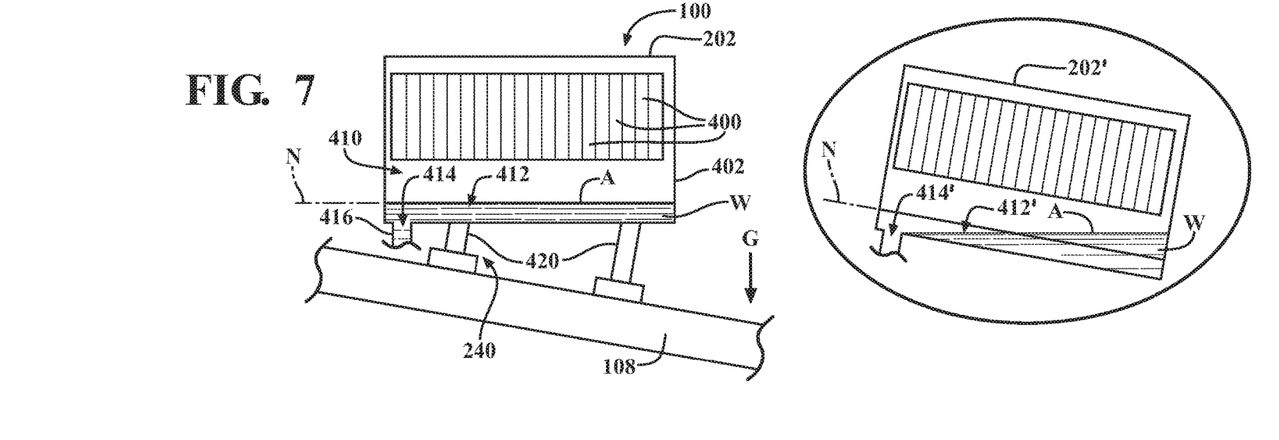
FIG. 7 is a cross section of the FCV across the line M-M in FIG. 2B during an inclination event, showing the body, the fuel cell stack and the pivoting system, with the exhaust water drainage port below an actual exhaust water level by the operation of the pivoting system according to the process of FIG. 6.

As shown with additional reference to FIG. 7, with the FCV 100 in the midst of an inclination event, the body 108 is inclined. Specifically, the body 108 is inclined away from the exhaust water drainage port 414. Moreover, as shown for a fuel cell stack 202' of an otherwise similar vehicle whose exhaust water collector 412' is susceptible to assuming the inclination of the body 108, the body 108 is inclined away from the exhaust water drainage port 414' to an extent associated with the actual exhaust water level A falling below the exhaust water drainage port 414' if the exhaust water collector 412' assumed the inclination of the body 108.

With their identification of the inclination event and the corresponding demand to pivot the exhaust water collector 412 according to operation 606, the control modules 128 operate the pivoting system 240 to satisfy the demand to pivot the exhaust water collector 412 according to operation 608. By the operation of the pivoting system 240, the exhaust water collector 412 is pivoted. Specifically, with the body 108 inclined away from the exhaust water drainage port 414, the exhaust water collector 412 is pivoted oppositely to the inclination of the body 108, toward the exhaust water drainage port 414. Moreover, with the inclination of the exhaust water collector 412 thus adjusted apart from, and oppositely to, the inclination of the body 108, the exhaust water collector 412 is leveled or, in other words, tilted to or otherwise toward the gravity direction G that the body 108 is tilted from. Accordingly, the prospect of the actual exhaust water level A falling below the exhaust water drainage port 414 is eliminated. With the prospect of the actual exhaust water level A falling below the exhaust water drainage port 414 eliminated, the prospect of the exhaust water W not being discharged from around the fuel cells 400 by the operation of the water exhaust system 410 is eliminated. And, with the prospect of the exhaust water W not being discharged from around the fuel cells 400 eliminated, the prospect of the operation of the fuel cell stack 202 being frustrated is eliminated.

Among other things, it follows that the pivoting system 240 is advantageous when the body 108 is inclined away from the exhaust water drainage port 414 when the FCV 100 drives along uphill ground. Specifically, in many cases, demands to power the wheels 114 materialize in relation to driving the FCV 100 along uphill ground. And, in the fuel-cell-powered implementation, with the motor 206 principally powering the wheels 114 using electrical energy from the fuel cell stack 202, demands to power the wheels 114 correspond to operation events for the fuel cell stack 202. By the operation of the pivoting system 240, the prospect of the operation of the fuel cell stack 202 being frustrated is eliminated commensurately with the importance of the FCV 100 continuing to drive along the uphill ground by the operation of the fuel cell stack 202.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising: a body;
a fuel cell stack supported by the body for tilting relative thereto, the fuel cell stack including a fuel cell operable to generate electrical energy using fuel and to generate exhaust water as a byproduct, and an exhaust water drainage port in fluid communication with the fuel cell;
a pivoting system, the pivoting system mechanically connected between the body and the fuel cell stack, and operable to selectively tilt the fuel cell stack relative to the body; and at least one control module, the at least one control module communicatively connected to the pivoting system, and configured to:
operate the pivoting system in response to an inclination event, the inclination event associated with the body being tilted away from the exhaust water drainage port, wherein by the operation of the pivoting system, the fuel cell stack is tilted relative to the body toward the exhaust water drainage port.

2. The vehicle of claim 1, wherein operating the pivoting system in response to the inclination event includes operating the pivoting system conditionally upon the inclination event being associated with the body being tilted away from the exhaust water drainage port.

3. The vehicle of claim 1, wherein operating the pivoting system in response to the inclination event includes operating the pivoting system conditionally upon identifying an operation event, the operation event associated with the fuel cell being operated to generate electrical energy using fuel.

4. The vehicle of claim 1, wherein the fuel cell stack further includes an exhaust water collector in fluid communication with the fuel cell, and the exhaust water drainage port is on the exhaust water collector in fluid communication therewith.

5. The vehicle of claim 4, wherein the fuel cell stack further includes an exhaust water discharge line connected over the exhaust water drainage port in fluid communication therewith, the exhaust water discharge line opening outside the exhaust water collector.

6. The vehicle of claim 5, wherein the exhaust water discharge line opens to the environment surrounding the vehicle.

7. The vehicle of claim 1, further comprising:
a drivetrain supported by the body, the drivetrain including at least one wheel; and
a motor to which the drivetrain is mechanically connected supported by the body, the motor electrically connected to the fuel cell, and operable to power the at least one wheel using electrical energy from the fuel cell.

8. A vehicle, comprising:
a body;
an exhaust water collector for a fuel cell stack supported by the body for tilting relative thereto;
a pivoting system, the pivoting system mechanically connected between the body and the exhaust water collector, and operable to selectively tilt the exhaust water collector relative to the body; and
at least one control module, the at least one control module communicatively connected to the pivoting system, and configured to:

operate the pivoting system in response to an inclination event, the inclination event associated with the body being tilted from the gravity direction, wherein by the operation of the pivoting system, the exhaust water collector is tilted relative to the body toward the gravity direction.

9. The vehicle of claim 8, further comprising:
an exhaust water drainage port on the exhaust water collector in fluid communication therewith.

10. The vehicle of claim 9, further comprising:
an exhaust water discharge line connected over the exhaust water drainage port in fluid communication therewith, the exhaust water discharge line opening outside the exhaust water collector.

11. The vehicle of claim 10, wherein the exhaust water discharge line opens to the environment surrounding the vehicle.

12. The vehicle of claim 8, wherein by the operation of the pivoting system, the exhaust water collector is tilted relative to the body to the gravity direction.

13. The vehicle of claim 8, wherein operating the pivoting system in response to the inclination event includes operating the pivoting system conditionally upon the inclination event being associated with the body being tilted from the gravity direction.

14. A vehicle, comprising: a body;
a fuel cell stack supported by the body for tilting relative thereto, the fuel cell stack including a fuel cell operable to generate electrical energy using fuel and to generate exhaust water as a byproduct, an internal exhaust water collector in fluid communication with the fuel cell, the exhaust water collector subject to assuming the inclination of the fuel cell stack, and an exhaust water drainage port on the exhaust water collector in fluid communication therewith, wherein on the exhaust water collector, the exhaust water drainage port is below a nominal exhaust water level local to the exhaust water collector;
a pivoting system, the pivoting system mechanically connected between the body and the fuel cell stack, and operable to selectively tilt the fuel cell stack relative to the body; and at least one control module, the at least one control module communicatively connected to the pivoting system, and configured to:
operate the pivoting system in response to an inclination event, the inclination event associated with the body being tilted away from the exhaust water drainage port, wherein by the operation of the pivoting system, the fuel cell stack is tilted relative to the body toward the exhaust water drainage port, whereby on the exhaust water collector, when there is exhaust water therein, the exhaust water drainage port is below an actual exhaust water level local to the exhaust water.

15. The vehicle of claim 14, wherein operating the pivoting system in response to the inclination event includes operating the pivoting system conditionally upon the inclination event being associated with the body being tilted away from the exhaust water drainage port.

16. The vehicle of claim 14, wherein operating the pivoting system in response to the inclination event includes operating the pivoting system conditionally upon the inclination event being associated with the body being tilted away from the exhaust water drainage port to an extent associated with the actual exhaust water level falling below the exhaust water drainage port if the exhaust water collector assumed the inclination of the body.

17. The vehicle of claim 14, wherein operating the pivoting system in response to the inclination event includes operating the pivoting system conditionally upon identifying an operation event, the operation event associated with the fuel cell being operated to generate electrical energy using fuel.

18. The vehicle of claim 14, wherein the pivoting system is mounted to the body, the fuel cell stack is mounted to the pivoting system as a unitary module, and the pivoting system supports the fuel cell stack for tilting relative to the body.

19. The vehicle of claim 14, wherein the fuel cell stack further includes an exhaust water discharge line connected over the exhaust water drainage port in fluid communication therewith, the exhaust water discharge line opening outside the exhaust water collector to the environment surrounding the vehicle.

20. The vehicle of claim 14, further comprising:
a drivetrain supported by the body, the drivetrain including at least one wheel; and
a motor to which the drivetrain is mechanically connected supported by the body, the motor electrically connected to the fuel cell, and operable to power the at least one wheel using electrical energy from the fuel cell.

* * * * *